US009950938B1

(12) United States Patent
Warrington

(10) Patent No.: US 9,950,938 B1
(45) Date of Patent: Apr. 24, 2018

(54) APPARATUS AND RELATED METHODS FOR CLEANING AND USING SWIMMING POOLS AND OTHER WATER

(71) Applicant: Bruce Warrington, San Juan Capistrano, CA (US)

(72) Inventor: Bruce Warrington, San Juan Capistrano, CA (US)

( * ) Notice: Subject to any disclaimer, the term of this patent is extended or adjusted under 35 U.S.C. 154(b) by 0 days.

(21) Appl. No.: 15/169,379

(22) Filed: May 31, 2016

Related U.S. Application Data

(60) Provisional application No. 62/168,604, filed on May 29, 2015.

(51) Int. Cl.
*C02F 1/68* (2006.01)
*C02F 101/32* (2006.01)
*C02F 103/42* (2006.01)

(52) U.S. Cl.
CPC .............. *C02F 1/683* (2013.01); *C02F 1/686* (2013.01); *C02F 1/687* (2013.01); *C02F 2101/32* (2013.01); *C02F 2103/42* (2013.01); *C02F 2305/04* (2013.01)

(58) Field of Classification Search
CPC .......... C02F 1/683; C02F 1/686; C02F 1/687; C02F 2101/32; C02F 2103/42; C02F 2305/04
USPC ............................................ 210/167.11, 232
See application file for complete search history.

(56) References Cited

U.S. PATENT DOCUMENTS 4,880,547 A * 11/1989 Etani .......................... B05B 7/04 210/728
5,019,250 A * 5/1991 Lorenzen .............. B01F 1/0022 210/104
5,128,342 A * 7/1992 Globus .................. A01N 59/00 252/186.35
5,709,793 A * 1/1998 Kisner .................. E04H 4/1609 210/167.11
6,033,560 A * 3/2000 Kisner .................. E04H 4/1281 210/167.11
6,338,800 B1 * 1/2002 Kulperger ................. C02F 1/42 210/167.11

OTHER PUBLICATIONS amazon.com, "GAME 4821 ePool Wireless Water Chemistry Monitoring System", May 8, 2016, 1 page.
amazon.com, "GAME Small Underwater Floating Light and Fountain for Pools", May 8, 2016, 1 page.
amazon.com, "PoolSupplyTown 1" Flotaing Mini Chlorine / Bromine Tablet Dispenser for Above-ground Pool, Spa, Hot Tub, Jacuzzi, and Fountain, May 8, 2016, 1 page.
amazon.com, "Sparkling Standard 3-Tier Swimming Pool Fountain", May 8, 2016, 1 page.
amazon.com, "Great American Merchandise and Events (GAME)", May 8, 2016, 3 pages.
Pool & Spa News, "New Products", p. 22, Apr. 22, 2016.

* cited by examiner

*Primary Examiner* — Fred Prince
(74) *Attorney, Agent, or Firm* — J. Mark Holland & Associates; J. Mark Holland; Alison L. Adnan

(57) ABSTRACT

Methods and apparatus are disclosed for improved apparatus and methods for cleaning swimming pools or similar bodies of water. The apparatus includes a device selectively engageable with an elongated pole, which can be disengaged from the pole and thrown into the pool water where it will dispense surfactant during the cleaning process.

11 Claims, 25 Drawing Sheets

APPARATUS AND RELATED METHODS FOR CLEANING AND USING SWIMMING POOLS AND OTHER WATER

CROSS-REFERENCE TO RELATED APPLICATION

This application is a continuation of U.S. Patent Application Ser. No. 62/168,604 filed May 29, 2015, the contents of which are incorporated herein by reference

FIELD OF THE INVENTION

This invention relates broadly to cleaning and maintaining bodies of water such as swimming pools and the like. As used herein, such bodies of water are intended to include without limitation swimming pools, spas, hot tubs, water elements, and others. As indicated herein, the inventions disclosed can be used in a broad range of applications and provide many benefits.

BACKGROUND OF THE INVENTION

A number of factors and elements are involved in maintaining and servicing bodies of water, and many of them are interrelated. Examples of such factors include the economics of those efforts (costs of materials and equipment, labor costs, etc.), the degree of cleanliness desired, the location of the water with respect to trees and leaves and/or other contaminants, and others.

In many situations, it can be important for personnel to be quick and efficient in performing such service duties. Several factors can affect that speed and efficiency. Examples such as surface action and water clarity can be an issue when trying to gather and remove accumulated debris. Other factors can obscure the user's visibility through the water surface down to the location of the debris, and thus impair the user's service efforts or make them less efficient. Other examples of these factors include the tools used, the presence of wind, the presence of surface action, and other turbidity. Typically any of these can adversely affect the time required to clean and service a given body of water.

Most users, even professional servicemen, need or at least benefit from more clear water conditions to do a good job of cleaning. If water conditions are unfavorable many attempt, just prior to vacuuming, to influence water clarity by scrubbing the pool waterline (on the sidewalls of the pool) with tile soap. This produces soap bubbles or at least releases some soap/surfactants onto the water surface, which increases the water's surface tension and correspondingly reduces any ripples or other disturbances on the surface. This reaction tends to arrest some motion of the water and generally stills the water surface, improving viewing into the water by the serviceman standing on the pool deck or other surface adjacent the body of water.

Typically, however, to maintain that desired surface tension and visibility through the duration of the cleaning process, service personnel have to reapply soap-type solutions. Such personnel commonly use any of a range or combinations of multiple varieties and concentrations of soap or other surfactants. Commonly, service personnel use any bulk tile soap solution, and especially because it is a bulk solution, it can be easy for them to apply it in inappropriate concentrations or in inconsistent ways. Among other things, these products typically have corresponding multiple varieties of containers/bottles and opening tops, leading to further inconsistent applications and/or use of the soap. In addition, to avoid the need to frequently refill those containers, servicemen sometimes use larger, heavier bottles, but those frequently are so cumbersome that the user sets it down with his other tools as he is moving around the pool (standing on the deck or otherwise above the waterline), and thus has to make multiple trips back to get that container in order to reapply the solution to tools or the water surface at intervals during the cleaning process.

Servicemen frequently carry a separate bottle in one hand, and apply soap to a pole mounted scrubber in the other hand. Scrubbing is a two hand job and trying to carry a container while scrubbing does not allow the user to grip the pole well. Cooler weather can also affect solution density or viscosity. Substandard solutions and containers widely vary and become difficult to apply under these circumstances. Certain additives even obscure visibility when improperly applied. Excesses often fall into solution, sink to bottom surfaces or are unsafely spilled on slippery decks and surrounding surfaces. All of these and other problems with prior art systems and apparatus slow the user's efficiency in cleaning the pool or other body of water.

Thus, the present inventions are directed to improvements for the apparatus and methods of cleaning pools or similar bodies of water, including sequestering floating oils/light debris, controlling surface action and visibility, and provide apparatus and methods to safely and efficiently apply and maintain surfactants and/or other formulas in and on water surfaces, for cleaning or other purposes. Preferably, the inventions enhance surface visibility and speed the service and maintenance of bodies of water.

DETAILED DESCRIPTION OF EMBODIMENTS

Figure 1:
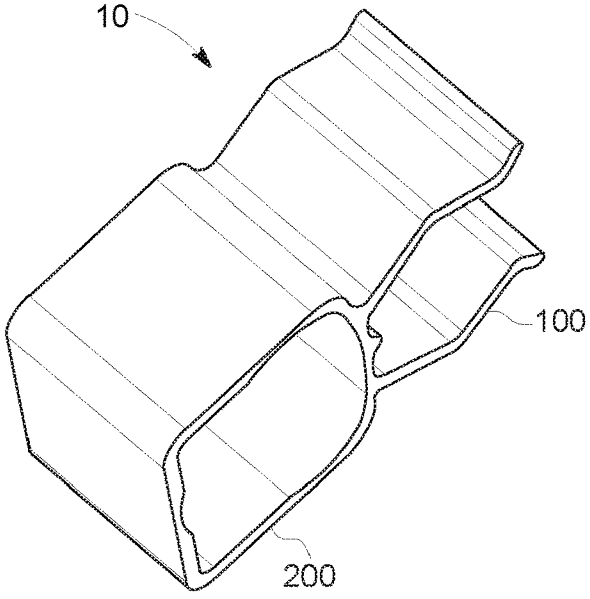
FIG. 1 is a perspective view of one of the many embodiments of the apparatus of the invention. Among other things, it shows an attachment device 10. The attachment device 10 preferably includes an adapter 100 for attaching it to a pole, and a container retainer 200 to operatively hold a container of surfactant or other useful material. The adapter portion 100 preferably is sized and configured to permit ready attachment and disengagement to/from a standard service pole or other tubing or handle mechanism. The container retainer portion 200 preferably is sized and configured to hold a bottle 300 or other container (not shown in FIG. 1) by an interference fit or friction fit cooperating with the relevant container or other means. Persons of ordinary skill in the art will understand that the portion 200 and/or the bottle/container (not shown) can be fabricated from a wide range of suitable materials, and can have a variety of desirable characteristics, such as being sufficiently flexible to enhance and/or permit the desired interference or friction fit. The materials selected for those elements preferably are such that they further facilitate the desired interference or friction fit as described herein. As indicated, those portions and the entire piece 10 can be fabricated from any suitable materials, but preferably are lightweight and sufficiently strong to enable a reasonable length of life of use for the apparatus. Persons of ordinary skill in the art will understand that the clip element 100 can be omitted in embodiments in which the container retainer 200 element is formed or otherwise integrally attached to the pole 12 (not shown), but that such embodiments will not allow the ready separation of the attachment device 10 or its clip elements 100/200 from the pole 12. Clip and container retainer embodiments also preferably enable ready removal of the container and/or adjustment and positioning of the attachment device 10 at various relative locations along the length of the bottle, to offset buoyancy changes in formula levels (as the surfactant is dispersed out of the bottle) and to vary the inverted floating angle or position of the assembly in the body of water, for better gravity dispersion of the surfactant.
Figure 2:
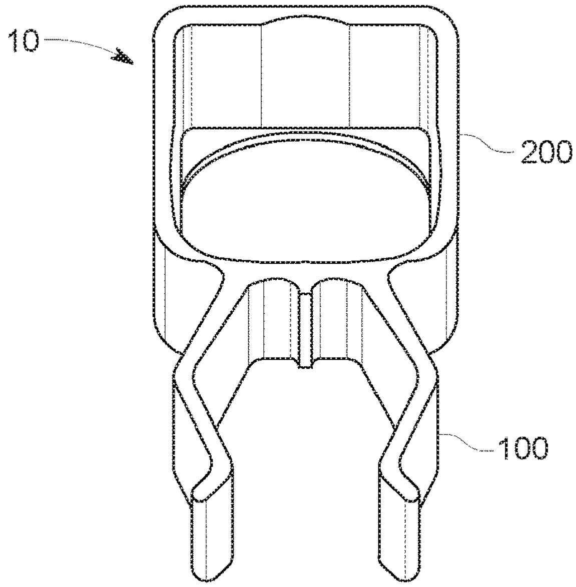
FIG. 2 is similar to FIG. 1, but shows a top angle view of the device 10, taken from the right as viewed in FIG. 1.
Figure 3:
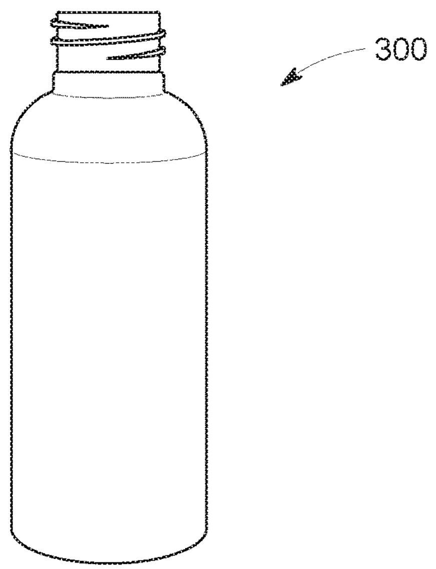
FIG. 3 is a side elevation view showing an example of a container (or bottle or reservoir) that may be used in connection with and/or as part of the invention, to contain cleaning solutions and formulas.
Figure 4:
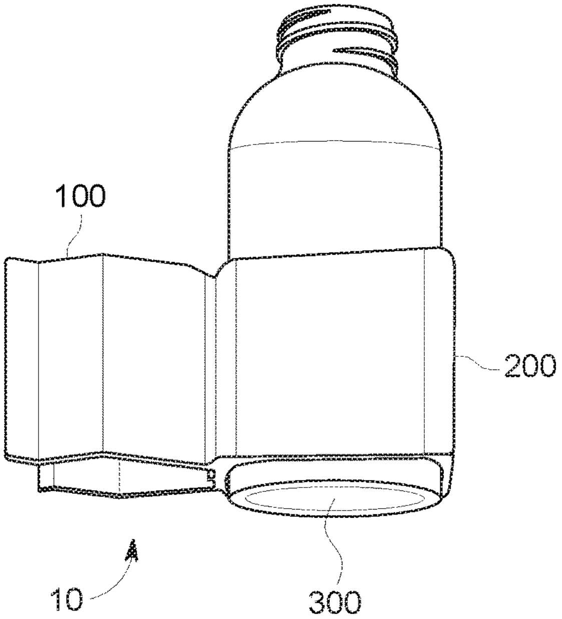
FIG. 4 is similar to FIG. 3, but shows the bottle 300 assembled into the device 10, and illustrates possible adapter/retainer lower positioning (further from the bottle opening).
Figure 5:
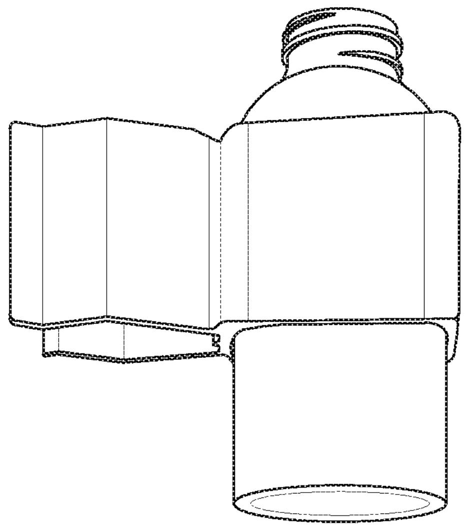
FIG. 5 is similar to FIG. 4, but shows possible adapter/retainer upper positioning on the bottle (nearer the bottle opening).
Figure 6:
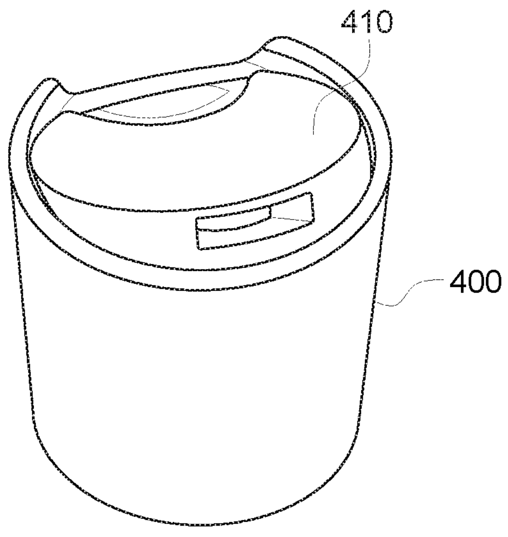
FIG. 6 illustrates an example of a preferred "disk-type" cap that can be used in practicing the inventions, with a push open/close top 410.
Figure 7:
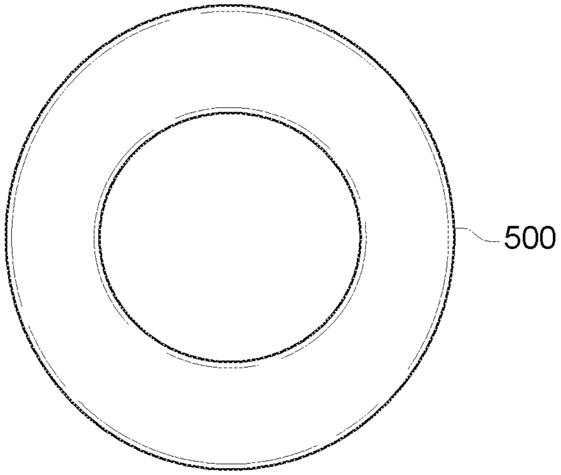
FIG. 7 shows a "ballast" element such as a washer 500, which can be assembled between the cap and shoulder of the container bottle for inverted buoyancy stabilization, as shown in FIG. 8.
Figure 8:
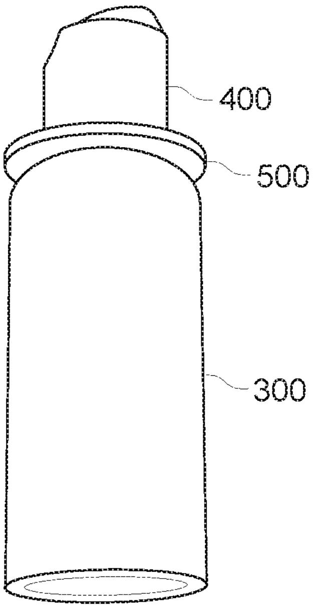
FIG. 8. shows the positioning of the bottle, ballast washer and nozzle cap assembled.

As indicated above, the inventions disclosed herein can be used in a broad range of applications and provide many benefits. One object of the invention is to provide improved apparatus and methods for cleaning or maintaining a swimming pool or similar body of water.

The invention preferably provides and/or includes a lightweight, buoyant, pole or tubing adapter 10. The adapter 10 preferably can be attached to a pole 12, and retains a bottle or container 300. As indicated above, in other embodiments (not shown), the adapter can be integrally formed or relatively permanently attached to the pole.

Although the invention can be practiced using a wide variety of materials and fabrication methods, preferably the components of the apparatus are fabricated in a simple construction, using lightweight and sufficiently strong plastic and/or metal or other materials.

Distortion of the work area visibility by water features, wind, action, glare, debris, all contribute to service inefficiency. The apparatus and methods of the invention, including the tool and its components and methods described herein, help to maintain water surfaces calm and clear, and make it easier to use proper formulas and proper application to bodies of water, and thereby minimize those negative factors. Preferably the invention improves the serviceable conditions for cleaning the body of water, including helping to ensure that floating, suspended and bottom debris can be sequestered, recognized, and efficiently removed.

As shown in FIGS. 1-14, embodiments of the invention can be used to provide a desirable dispersion of surfactant, including liquid surfactant, onto or into a body of water. FIGS. 15-22 illustrate some of the many other embodiments of the invention (including for a solid bar surfactant), and other preferred features of the invention. Some features are common among the drawings, although persons of ordinary skill in the art will understand that the invention can be practiced in many other ways and using apparatus that differs from that shown in the attached drawings.

For example, in FIGS. 1-14, an attachment device 10 preferably has a flexible clip portion 100 that can be readily engaged and disengaged to/from a pole 12. The details of that portion 100 can be any of a variety of shapes, and the attachment and removal to/from the pole provided in any suitable manner. The attachment device 10 also preferably has a retainer portion 200, sized and configured to matingly engage and operatively hold a container 300. A ballast element 500 such as a washer or ring or other saddling element can be provided to maintain desired orientation of the bottle assembly when it is deployed in a floating relationship on the surface of the water (so that the "top" of the container/bottle is downward into the water), and a cap 400 preferably is engaged with the bottle (to allow ready refills of the surfactant inside the container). Preferably the ballast is sufficiently heavy to cause the end of the bottle to which the ballast is attached to turn downward into the water, so that the dispersion and other actions described herein can occur.

Figure 9:
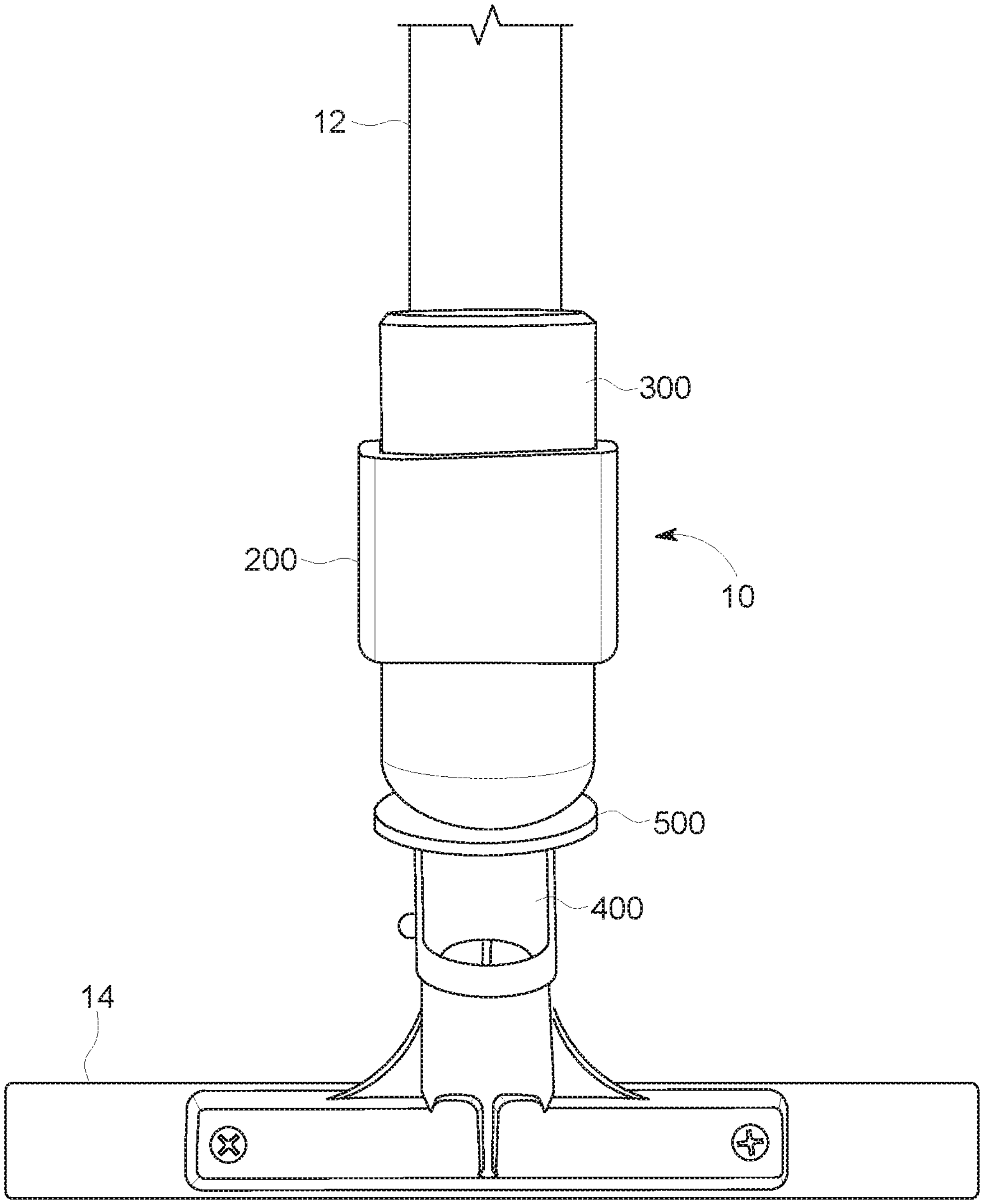
FIG. 9 is a top view of an assembly of the invention, illustrating one of the many ways in which the device 10 can be mounted onto a pole element 12. In this illustration, the assembly 10 is near a brush attachment 14.
Figure 10:
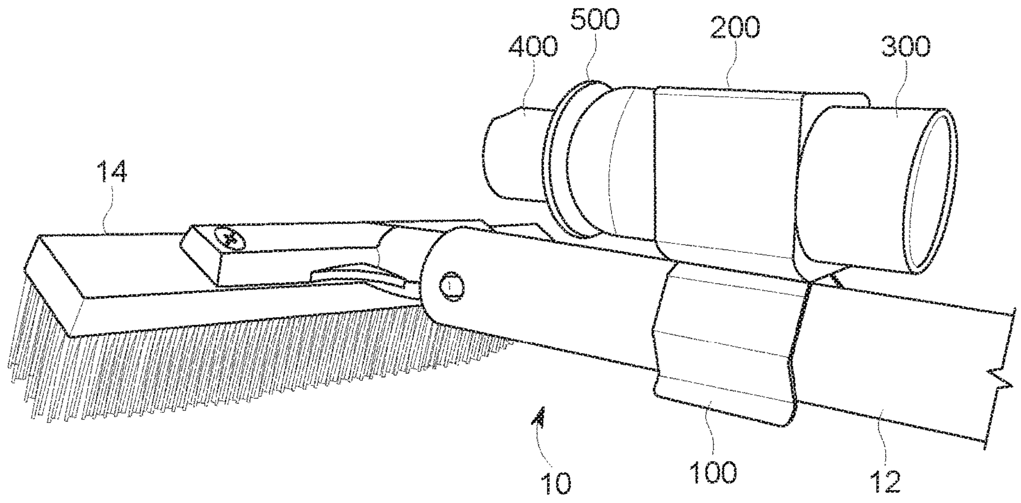
FIG. 10 is similar to FIG. 9, but illustrates the assembly from a side and slightly rearward perspective.
Figure 11:
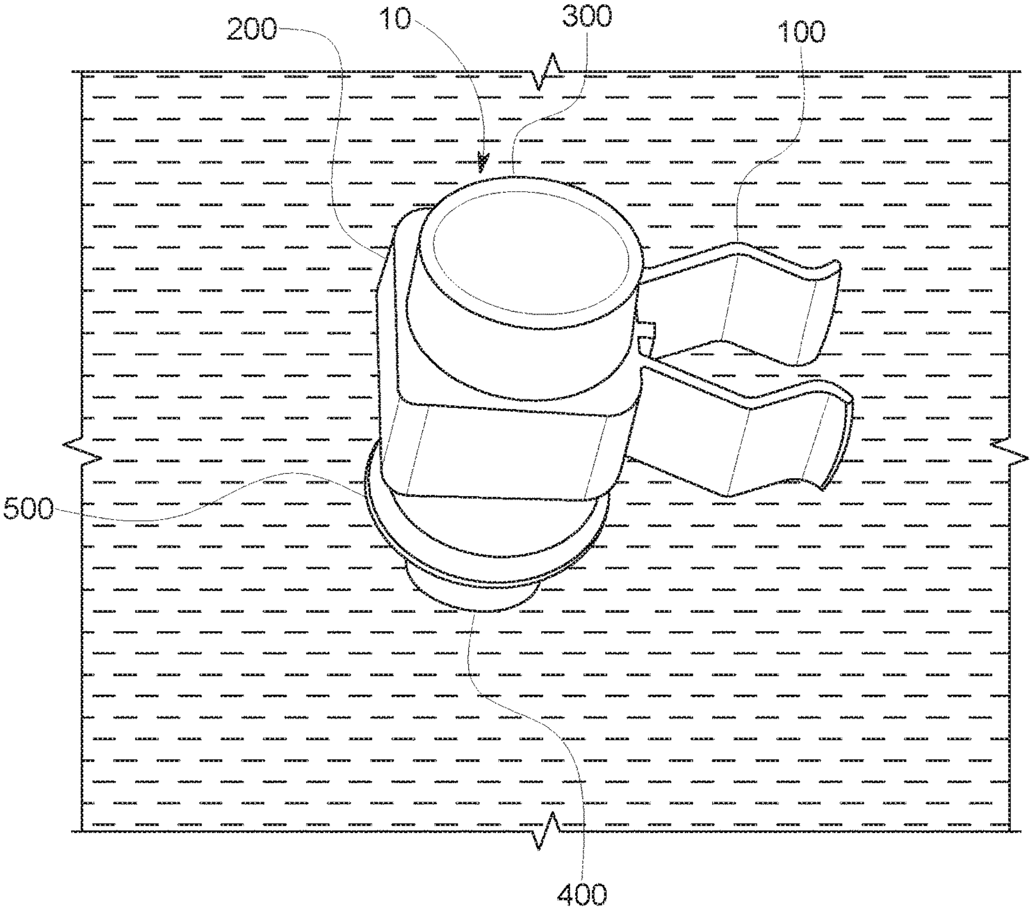
FIG. 11 is a perspective view illustrating an inverted device apparatus 10 removed from the pole 12 (not shown) with washer or other saddling element 500, deployed for gravity drip release into the pool/water.
Figure 12:
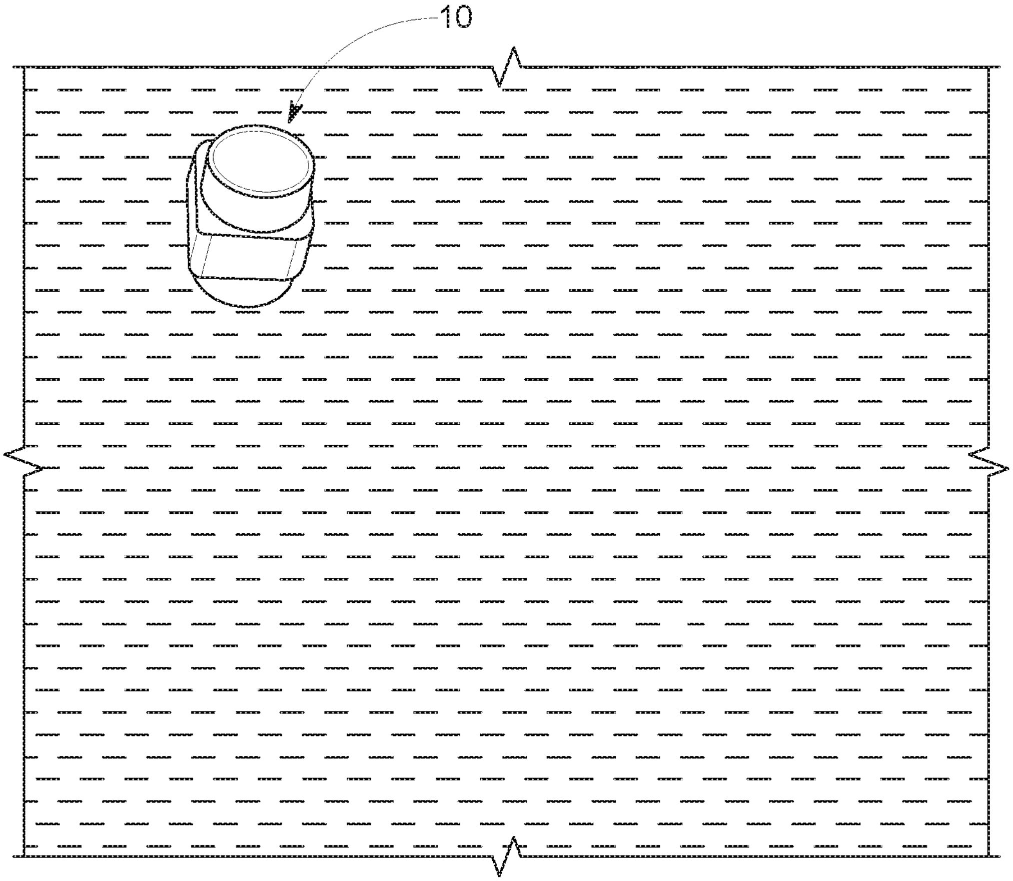
FIG. 12 is a distance view of the unit shown in FIG. 11, as placed to release formula and float independent and inverted in a pool, illustrating calm, visibly clear water resulting from floating the unit "open cap" in a pool with a breeze blowing.
Figure 13:
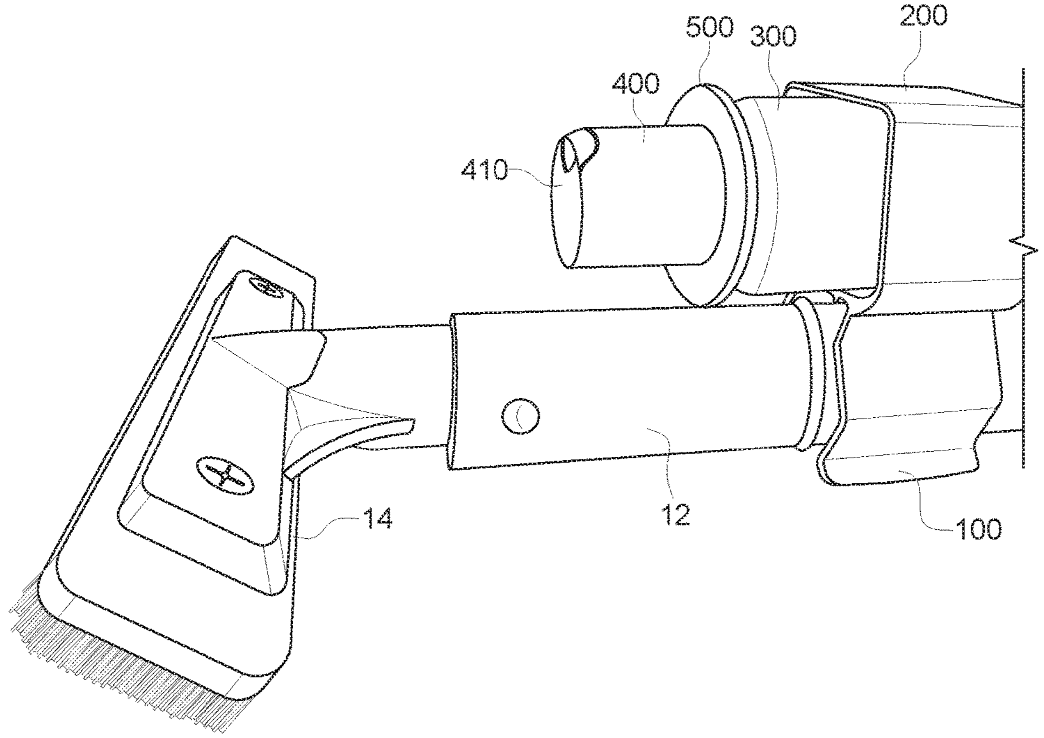
FIG. 13 is similar to FIGS. 9 and 10, but shows a close-up side elevation view of the apparatus.
Figure 14:
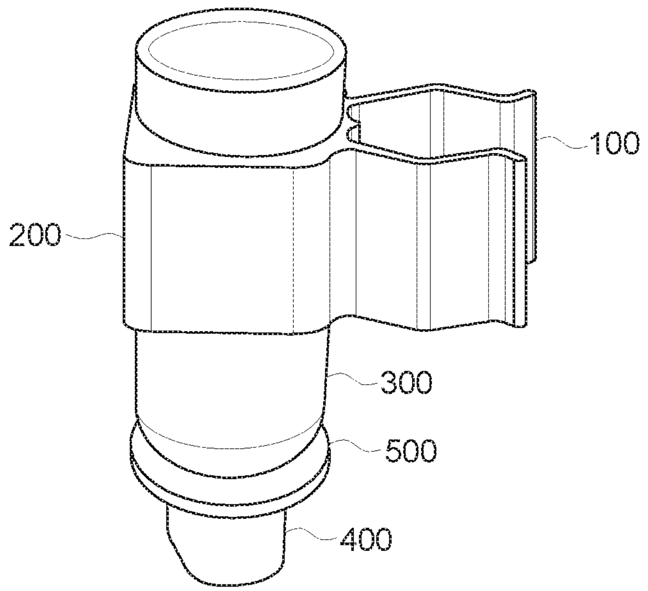
FIG. 14 is similar to FIG. 11, but shows the apparatus out of the water.
Figure 15:
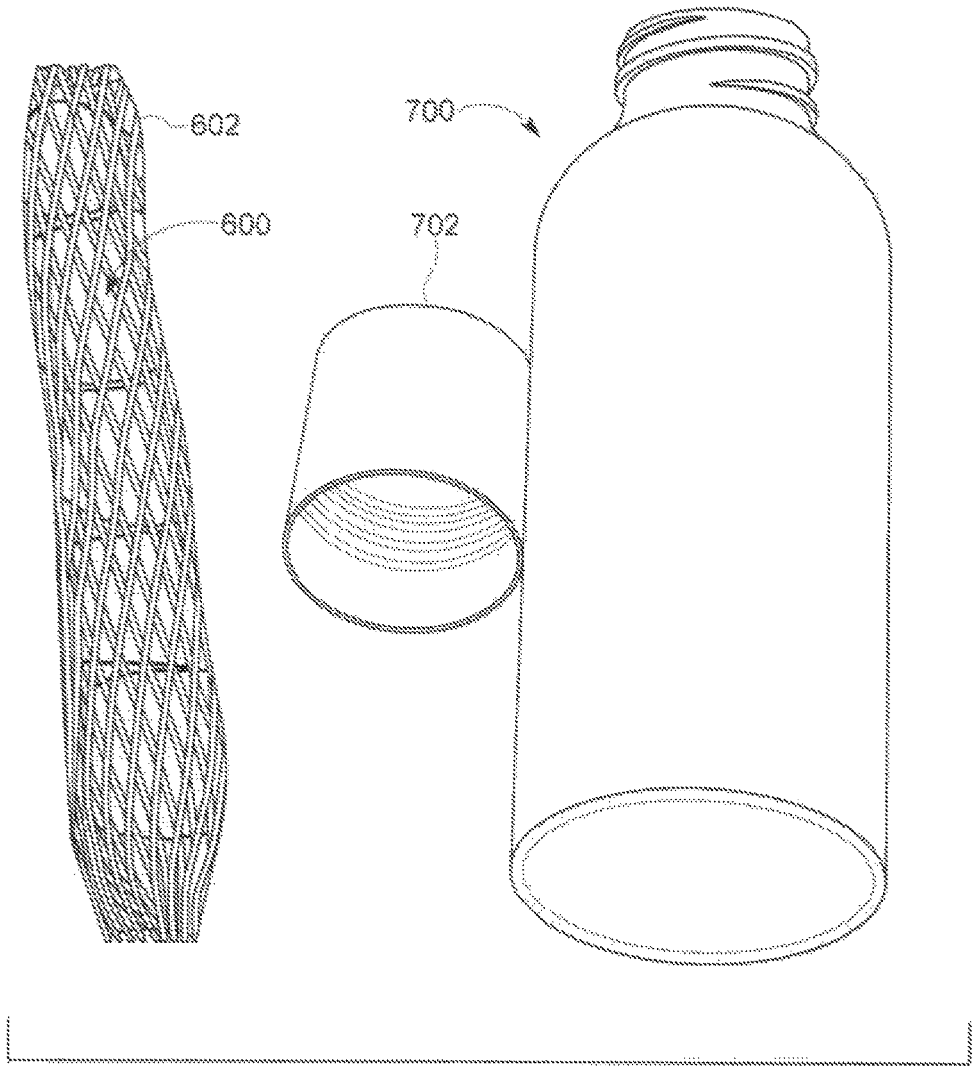
FIG. 15 illustrates another of the many embodiments of the invention, in which a solid bar of soap or other material is provided in a generally torpedo shape, and placed inside a bottle or other container.
Figure 16:
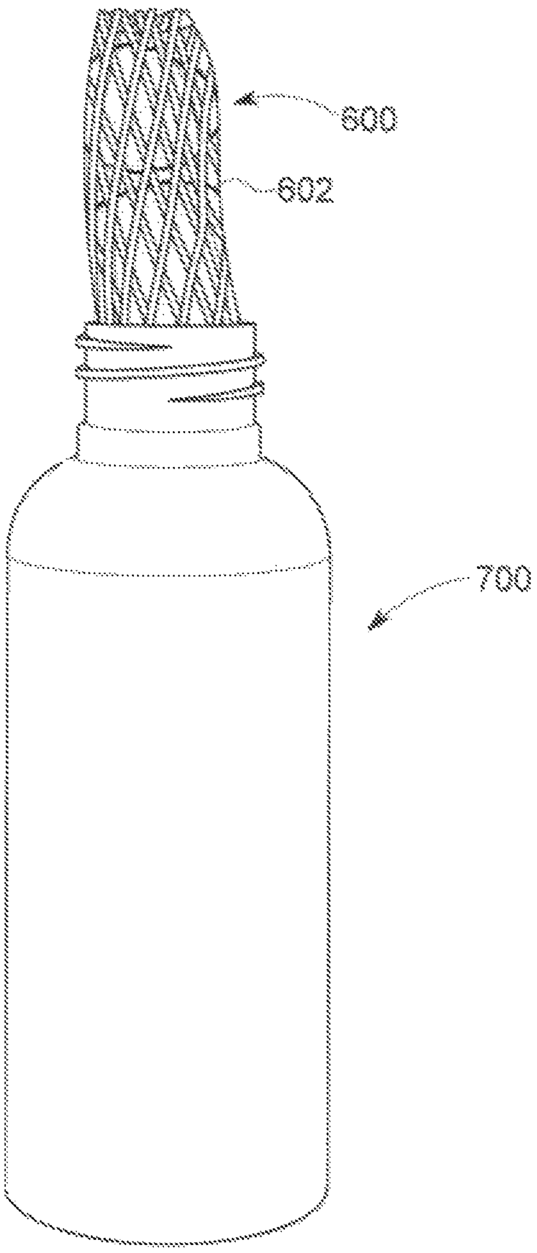
FIG. 16 is similar to FIG. 15, but illustrates the insertion of the solid bar into the container.
Figure 17:
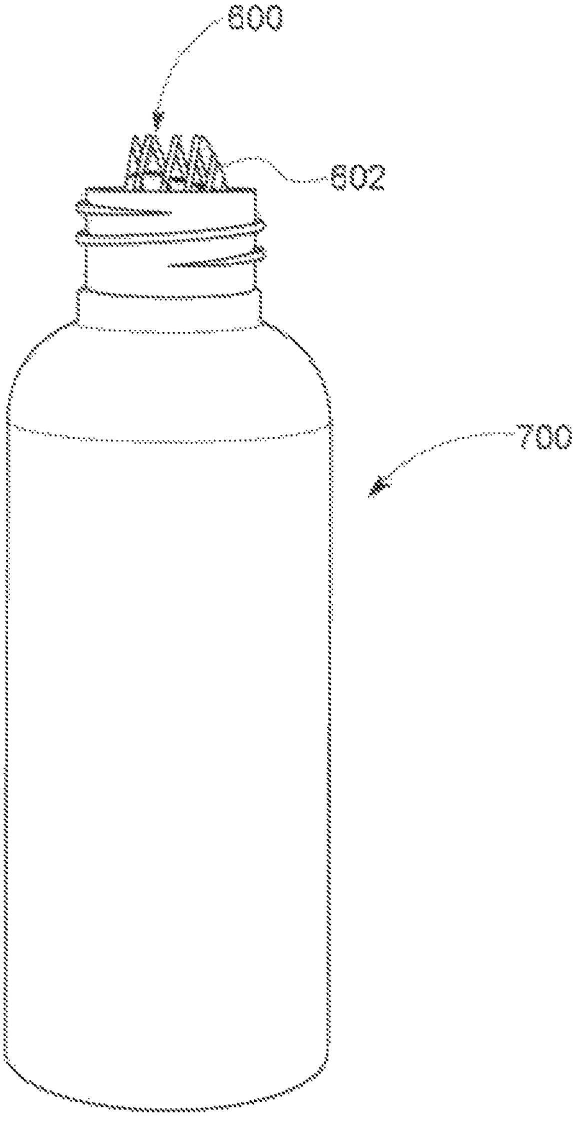
FIG. 17 is similar to FIG. 16, but illustrates the solid bar after insertion into the container.
Figure 18:
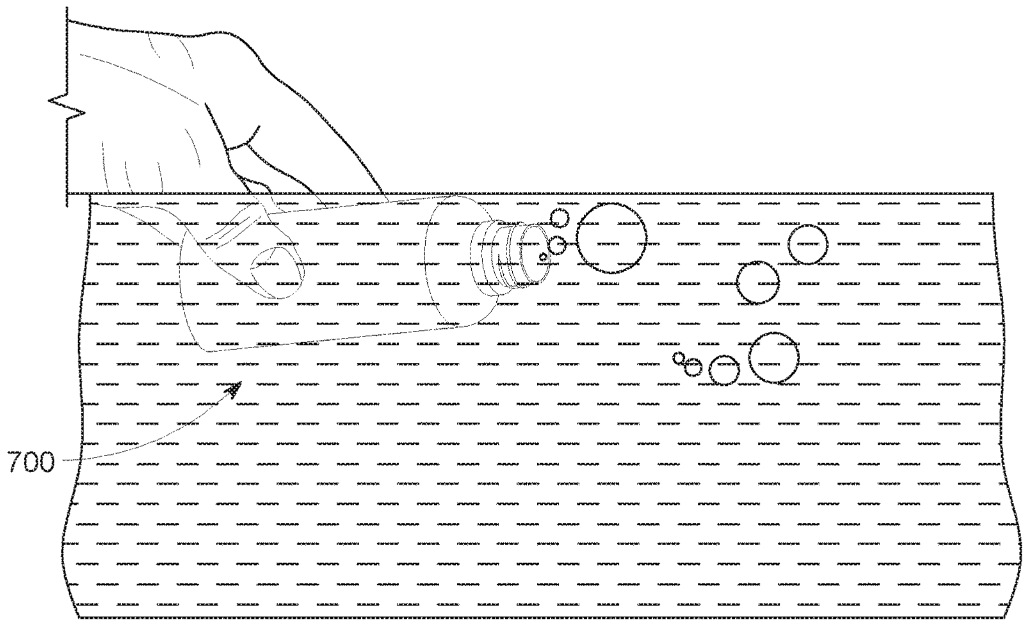
FIG. 18 is similar to FIG. 15, but illustrates the filling of the container with pool water, around the solid bar inside the container.
Figure 19:
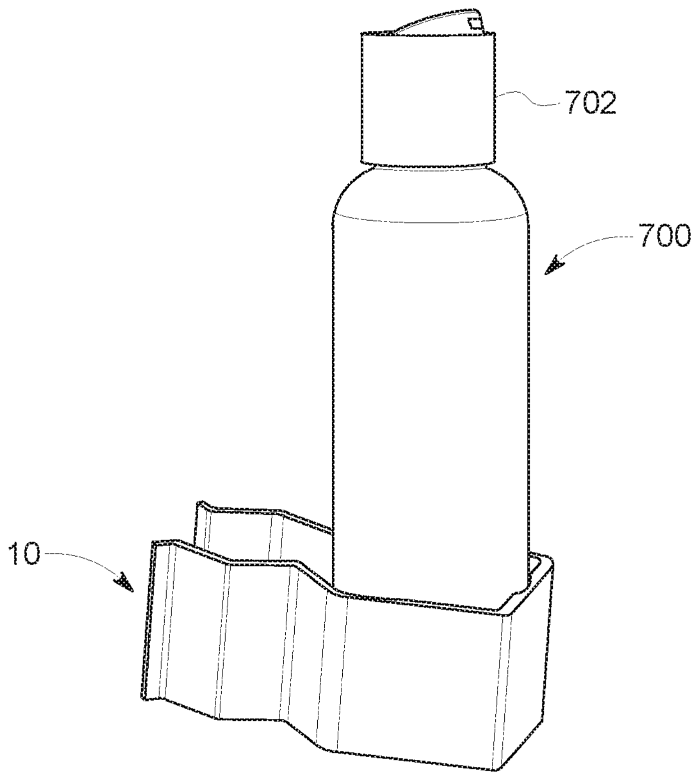
FIG. 19 illustrates the insertion of the container of FIG. 18 into an attachment device 10.

As shown in FIGS. 9 and 10, the assembly preferably can be engaged with a pole 12, for ready transportation between pools and/or around a pool. By opening the container lid 400, surfactant can be released even while the assembly 10 remains engaged with the pole 12. Alternatively, the assembly 10 can be removed from the pole 12 and deployed into the water, as shown in FIGS. 11 and 12. Further alternatively, the container assembly 300/400/500 can be separated from the attachment device 10 (leaving the attachment device 10 still connected to the pole 12) and deployed by itself into the pool water. FIGS. 13 and 14 provide additional views of this embodiment of the invention.

Other variations or embodiments of the invention include using a solid form of surfactant or other bar formula. This can be provided in a wide variety of forms and deployment devices, including the examples shown in FIGS. 15-22. In those figures, the soap bar 600 preferably is encased in a sock or a cage 602 of some type, fabricated from plastic or cloth or other suitable material, although persons of ordinary skill in the art will understand that no such element 602 is required in other embodiments of the invention. This "cage" 602 can help control the dissolving of the surfactant bar, and allow the pool water to wash over the bar, and can steadily dissolve the bar when it is in contact with the water, and can help keep the bar soap from clogging the cap orifice of the container 700. The solid bar can be provided in any of a wide variety of shapes and sizes, including a "torpedo or tablet" 600. Preferably, the bar/solid is small enough to allow ready refill and removal of the solid through the top opening of the bottle 700. Preferably, the user may remove the cap 702, insert the torpedo assembly 600/602, and fill the remaining space between torpedo and inside wall of the container with water (see FIG. 18). Preferably, the "torpedo" or other element 600 will gradually dissolve by repeated water ingress/egress or compression or inversion through the cap orifice and subsequent refills of water, including by the user removing the cap 702 and refilling the container with soap and/or water as needed. The user can employ shaking action of the assembly, to increase the dissolving action and/or the concentration of surfactant solid/liquid to be dispersed.

Figure 20:
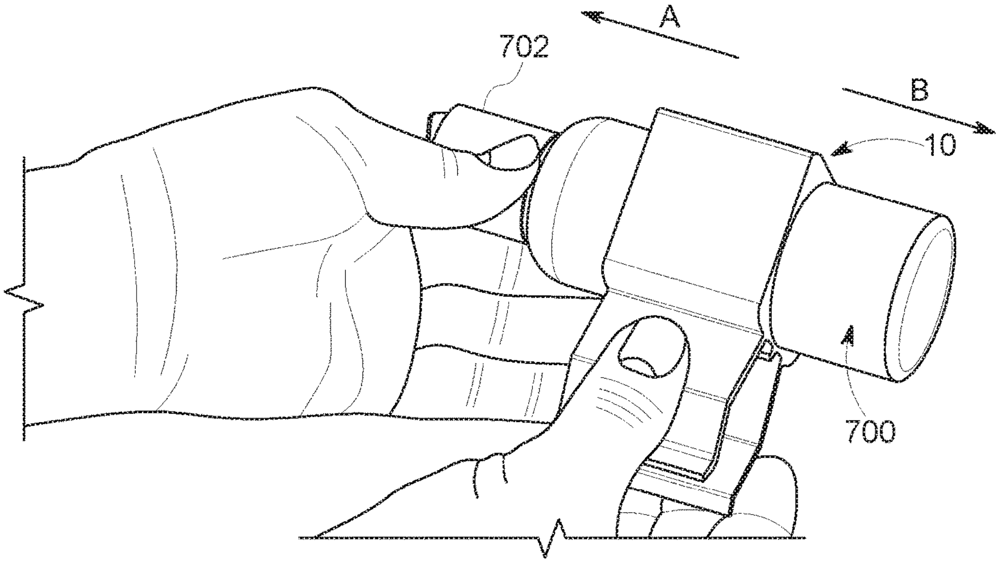
FIG. 20 illustrates the adjustment of the container of FIG. 18 with respect to the attachment device 10 (the container can be moved in the either the direction of arrow A or of arrow B as desired, relative to the attachment device 10).
Figure 21:
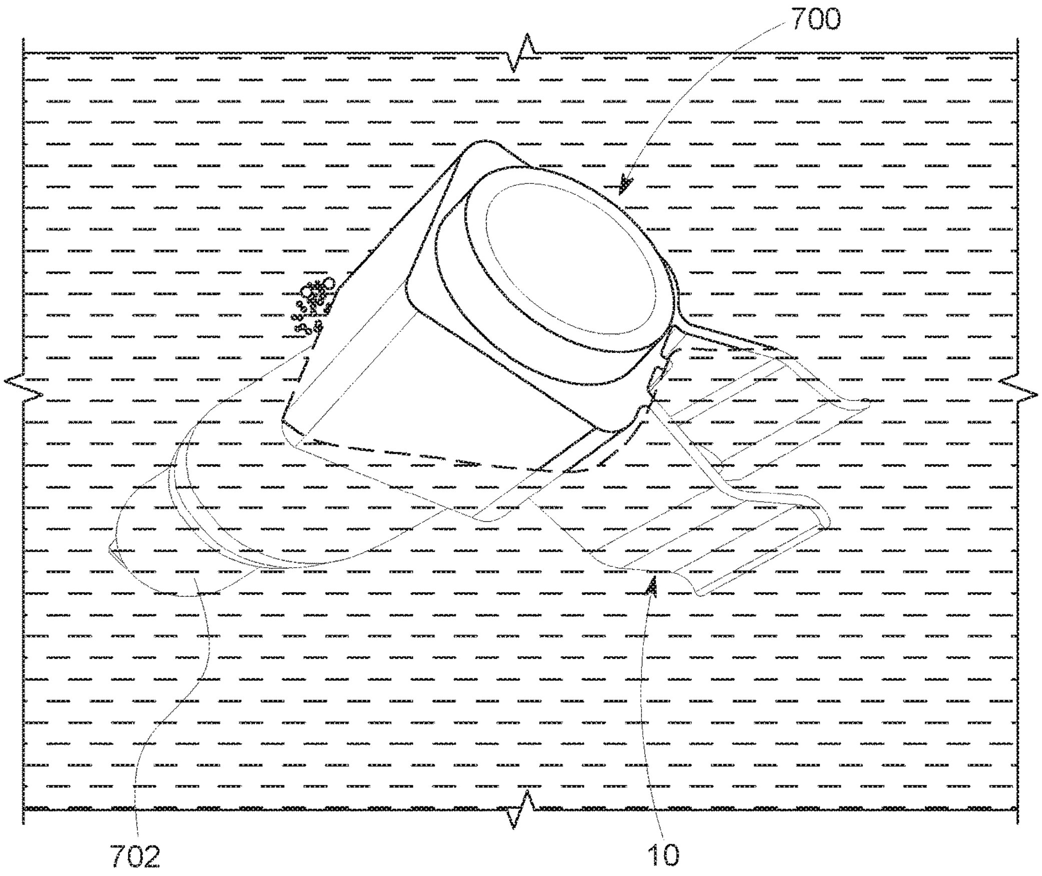
FIG. 21 illustrates the adjustment of the container of FIG. 18 with respect to the attachment device 10, with the container having been slid relatively further in the direction of arrow A of FIG. 20, so that the attachment device 10 is nearer the bottom of the container.
Figure 22:
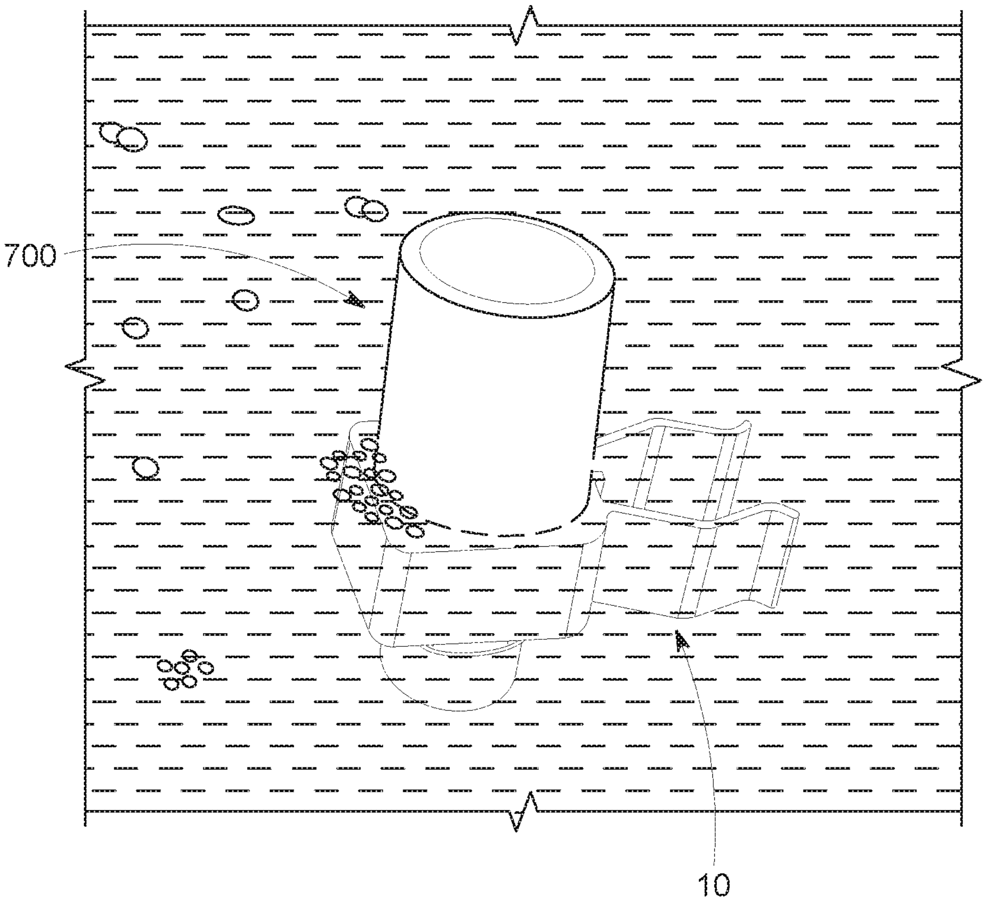
FIG. 22 illustrates the adjustment of the container of FIG. 18 with respect to the attachment device 10, with the container having been slid relatively further in the direction of arrow B of FIG. 20, so that the attachment device 10 is nearer the top or cap/opening of the container.

Preferably, the assembly or combination of elements allows the user to slide the device 10 (including the adapter and retainer portions) along the length of the sides of a flexible bottle 300/700. This is illustrated in FIGS. 20-22, by sliding in direction A or B (FIG. 20).

Preferably, the surfactant 600 or liquid forms of same can be simply refilled during convenient points of a service route or on service stops. Many other preferred features of the invention include the following examples:

1. The "Unit" allows consolidated portability
2. It eases refill or removal of the container
3. It is lightweight, and minimizes transport imbalance by being attached to or with existing tools
4. During service, (for embodiments in which the assembly is inverted and remains mounted on a service pole, with the cap open), the water pressure compression on the bottle changes and, at sufficient depth, can be enough to release Formula underwater, and some of the Formula can rise to the surface
5. For those same embodiments, while the assembly is above water (and attached, open and inverted, on a service pole), gravity drip of the Formula can be released below the nozzle, to tools and/or water surfaces.
6. The ability of this "Unit" to float. This eases safe retrieval from various locations around bodies of water. Buoyancy also allows service personnel to place the "Unit" independently, preferably inverted, in bodies of water, to disperse its Formula, and extend working area visibility
7. Adjusting the adapter/retainer portion up or down along the length of the bottle allows the ballast and cap to remain gravity inverted to compensate for changes in buoyancy
8. While on the surface, bobbing and tilting action of this "Unit" increases or maintains Formula release, till removed and closed.
9. The preferable transparent bottle allows viewing of Formula levels
10. A flexible container allows flex release of contents on tools and surfaces or additional manual dispersion techniques when required
11. A preferable low profile disk cap nozzle provides easy and protected access and minimizes leakage during transport
12. Formula, combined with cap orifice diameter, maintains a consistent flow for proper surface tension coverage and the maxi-mum amount of serviceable visibility
13. The apparatus and methods can reduce work and reduce wear and tear on the pool surface. For example, if the pool sidewall surfaces are clean at the waterline, the invention preferably also negates the usual "extra step" used by many servicemen, of perimeter water "sudsing" to provide enhanced water visibility. In other words, in order to provide the desired water surface clarity, many users commonly "scrub" the pool sidewall with soap at the waterline, to generate suds and thereby enhance visibility down into the water. The invention preferably makes this "sudsing" unnecessary when the waterline already is sufficiently clean. Hence a user can choose when waterline scrubbing is necessary, and not undertake that scrubbing when it would be a superfluous waste of time (when the only reason he would do it is to generate the suds/clarifying action). Over time, such scrubbing and its resultant abrasion can result in decreased surface finish resilience on the pool sidewall, and therefore this invention also can increase sidewall surface integrity at the waterline, and thereby the working life.

The embodiments of the present inventions may vary depending on whether the application or its devices is for commercial use during periodic cleaning, as opposed to being owned and used by a pool owner on a constant or regular basis, including in between actual cleanings to keep the surface of the water smoother than it would otherwise be. In the later cases, a battery-powered device may be programmed to run at certain times and be kept in the pool all the time. As shown in FIGS. 23-30, embodiments of the invention having a battery-powered pump can be used to provide a desirable dispersion of surfactant onto or into a body of water to help keep the water surface smooth even when not cleaning the pool, which can benefit other activities such as displaying video animations/other into the pool water.

For example, in FIGS. 23-30, a battery-powered device preferably has a pump device for mechanically dispersing formula into the water. The pump may provide an additional benefit in that it can increase formula volume and dispersion rates in larger bodies of water and/or water features under heavier weather or water movement conditions, as compared to gravity-induced and dissolved formula applications which can be inadequate for larger volumes of water requiring a larger volume of formula and/or larger coverage area. Preferably, the pump is positioned within the container containing the formula, and allows for increased flow of the formula from the container. The pump is preferably connected to a switch element capable of modulating the pump into several modes such as on/off, timed dispersion, and/or variable speed operation. Further, the pump and switch are connected to a power source, such as a battery, to power the pump and any other associated controls or devices. In such battery-powered pump embodiments, it may be desirable to have plumbing and/or valve devices within the container for separating and/or regulating formula solutions and/or to control propulsion of the device.

Figure 23:
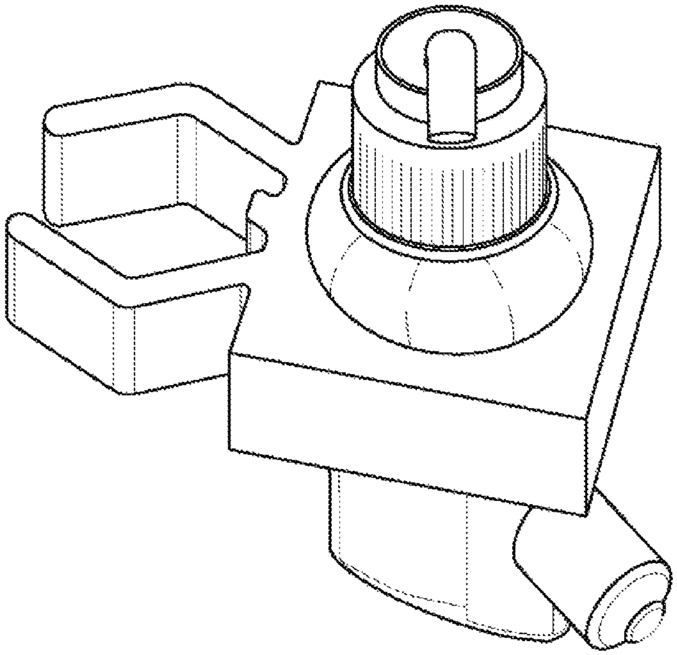
FIG. 23 illustrates another of the many embodiments of the invention, in which a battery-powered pump may be used in connection with and/or as part of the invention, to control and/or automate the dispersal of cleaning solutions and formulas.
Figure 24:
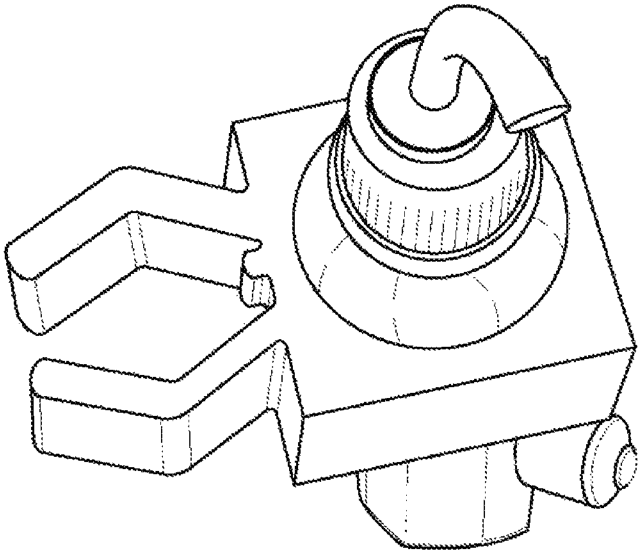
FIG. 24 is similar to FIG. 23, but illustrates a distance view of the unit shown in FIG. 23, as placed to release formula and float independent and upright in a pool.
Figure 25:
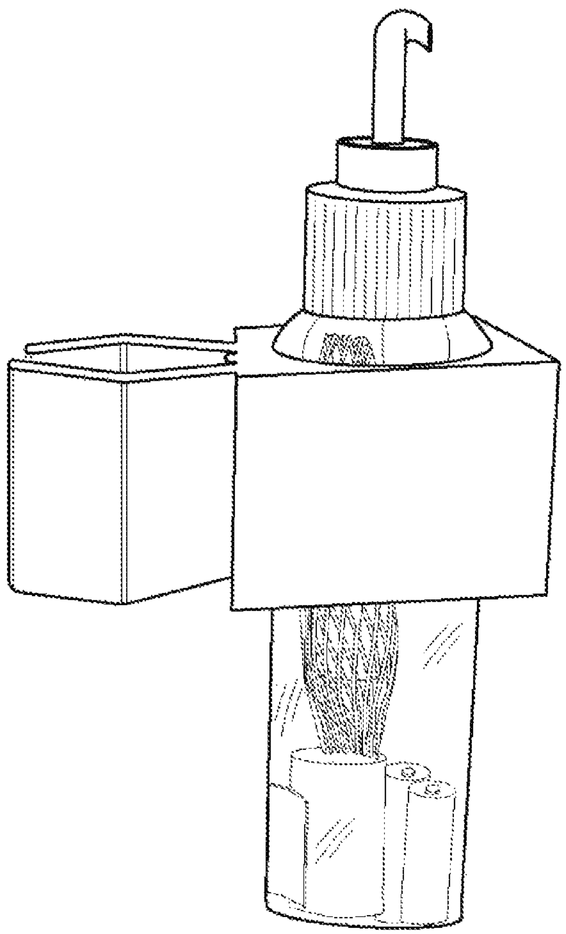
FIG. 25 is similar to FIGS. 23 and 24, but illustrates the assembly from a side perspective.
Figure 26:
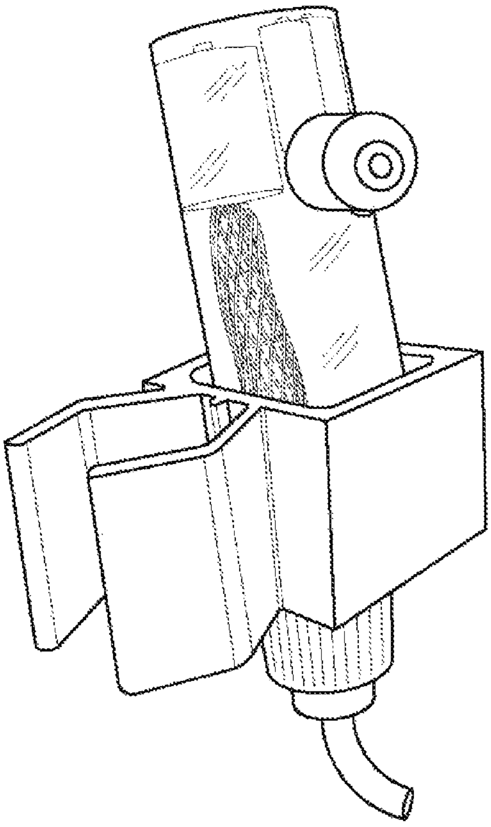
FIG. 26 is similar to FIG. 25, but illustrates the assembly from an inverted perspective.
Figure 27:
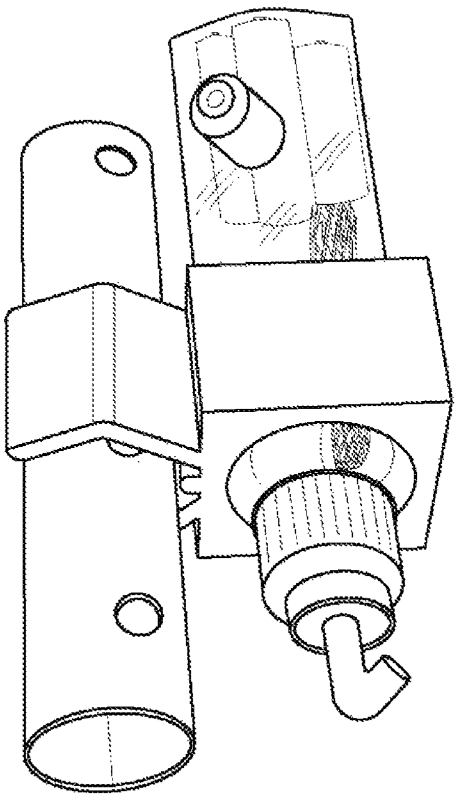
FIG. 27 is similar to FIG. 23, but illustrates one of the many ways in which the device can be mounted onto a pole element.
Figure 28:
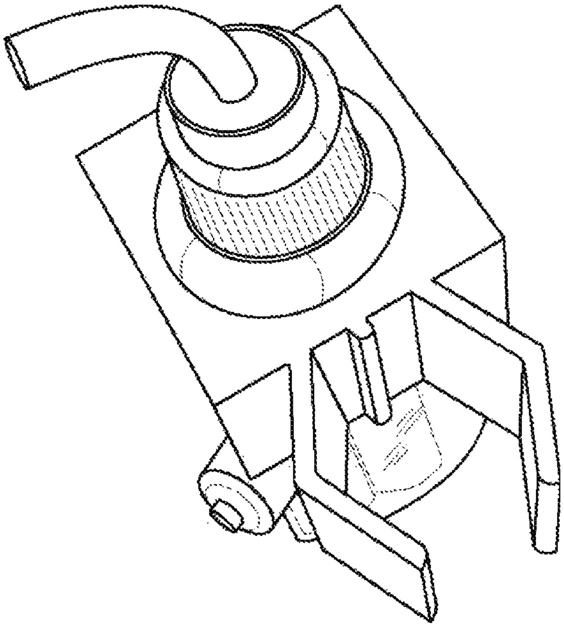
FIG. 28 is similar to FIGS. 25 and 26, but shows a top angle view of the device, taken from the left as viewed in FIG. 25.
Figure 29:
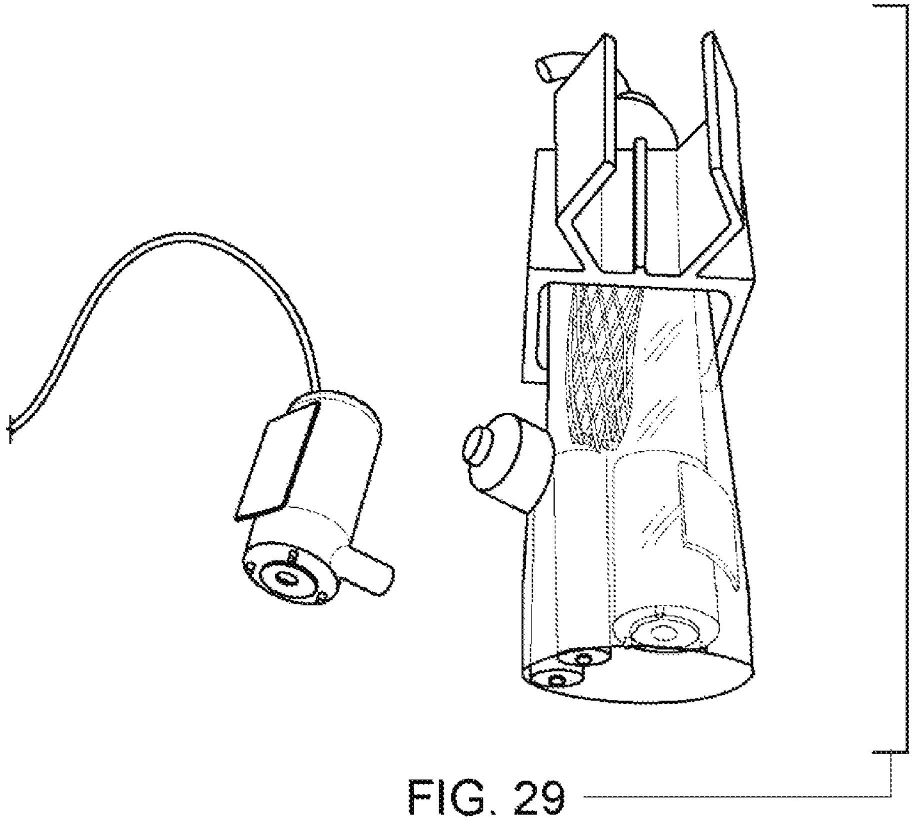
FIG. 29 is similar to FIG. 28, but illustrates an example of a preferred additional pump 30 that can be used in practicing the invention.
Figure 30:
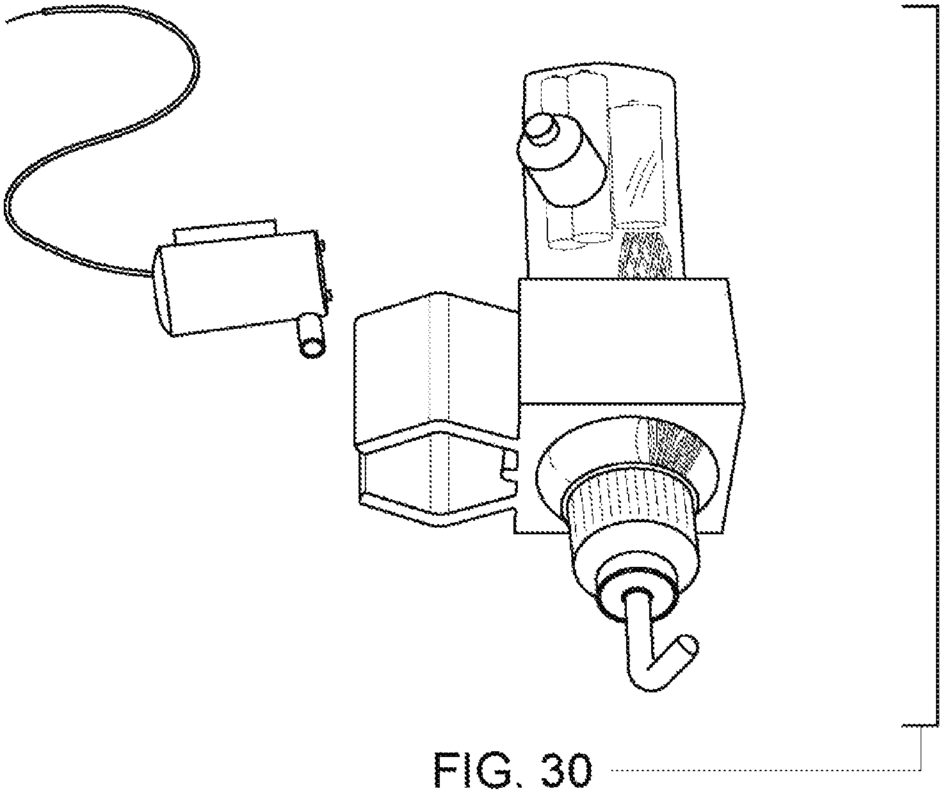
FIG. 30 is similar to FIG. 28, but shows a side perspective view of the assembly having an additional pump 30.

As shown in FIG. 27, the assembly may be engaged with a pole, for ready transportation between pools and/or around a body of water. In the figure, the assembly is shown engaged with pole section 20, but persons of ordinary skill in the art will appreciate that this illustration/photo is just a piece of a pole assembly for purposes of demonstrating the mounting of the assembly onto a pole. In such embodiments, the container is engaged within a retainer portion of an attachment device having a flexible clip portion for readily engaging and disengaging a pole. By powering the pump, surfactant formula can be released even while the assembly remains engaged with the pole. Alternatively, the assembly can be removed from the pole and deployed into the water, as shown in FIGS. 23 and 24. In such embodiments, the battery-powered pump container assembly is retained within the attachment device and the attachment device provides buoyancy for the container assembly. In other embodiments, buoyancy compensation devices may be provided and attached to the attachment device (in the pole retainer portion of the attachment device) for offsetting and/or stabilizing the weight of the container assembly and thus allowing it to float in the water when it otherwise might sink. Further alternatively, the battery-powered pump container assembly can be separated from the attachment device and deployed by itself into the water.

Unlike the inverted applications discussed above, the battery-powered pump embodiment of the present invention may be deployed upright in a body of water and disperse formula in that upright configuration. Preferably, the container has a lid or opening that allows the pumped formula to be released and dispersed into water. The lid may be provided with a sprayer-type device that allows for more coverage area of the pumped formula.

In a preferred embodiment of the present invention, a battery-powered pump may be used in connection with and/or as part of the invention, to control and/or automate the dispersal of cleaning solutions and formulas to keep the surface of the water smooth/calm at all times and/or in between actual cleanings. As shown in the figures, a battery-powered pump embodiment may provide an automated dispersion of surfactant into a body of water to help keep the water surface smoother than it would otherwise be which can benefit other activities such as displaying and viewing of underwater video animations/projected images/other such that the images/videos/etc. being displayed/viewed are clear and still. The present invention may provide an advantage for such underwater video/image display technology in that calm/smooth water provides easier and/or enhanced views of the images/videos being displayed.

Persons of ordinary skill in the art will appreciate that either the passive flow of surfactant into the water or the mechanical/active pumping of the surfactant by the pump embodiment may provide this benefit to underwater image display by keeping the water surface smooth for better viewing conditions. Further, persons of ordinary skill will appreciate that a smoother water surface provided by the present invention may benefit other activities, such as the viewing of light/color/other displays in the water, the use of cameras for taking photos and/or videos underwater, generally improving the ambiance and calmness of the water surface for quiet/other viewing activities, and many other activities.

Persons of ordinary skill in the art will appreciate that the present invention may be combined and/or incorporated with different features of prior art water technology, such as adapting prior art floating fountain/light technology or floating wireless chemical monitoring devices or remote control or timer technology, and utilizing that with the present surfactant release systems to provide calming of the surface at desired times and locations.

Persons of ordinary skill in the art will understand that the invention can be practiced with a wide range of apparatus and equipment, including elements shaped and sized differently from those shown in the attached drawings.

The present invention is described herein with reference to the accompanying Figures, which serve as illustrations of some of the many embodiments in which the invention may be practiced. Subject to the context and other factors (including for example the understanding of persons of ordinary skill in the arts relevant to the inventions), generally in those Figures and references similar reference numerals refer to similar or identical elements throughout this description.

Those Figures and references, and the other terminology used in these descriptions, are not intended to be interpreted in any limited or restrictive manner, simply because they are being utilized in conjunction with a detailed description of certain embodiments of the invention. Furthermore, various embodiments of the invention (whether or not specifically described herein) may include one or more of the novel features disclosed herein, no single one of which (a) is necessarily solely responsible for any particular desirable attribute(s) of the inventions or (b) is essential to practicing the inventions described.

For the purpose of summarizing the invention certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

These and other embodiments will become readily apparent to those skilled in the art from the detailed description herein of the preferred embodiments having reference to the attached figures, the invention not being limited to any particular preferred embodiment(s) disclosed. In other words, the apparatus and methods of the invention have been described with some particularity, but the specific designs, constructions, and steps disclosed are not to be taken as delimiting of the invention. A wide range of modifications and alternative structures and steps for practicing the invention will make themselves apparent to those of ordinary skill in the art, all of which will not depart from the essence of the invention, and all such changes and modifications are intended to be encompassed within the appended claims.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

What is claimed is:

1. Apparatus for improving the clarity of the surface of a swimming pool or similar body of water, including:

at least one container of surfactant, said surfactant formulated to increase surface tension of the water surface;

said container configured to control the flow of surfactant being released from the container when the container is deployed in a body of water;

at least one buoyant clip element having a retainer portion sized and configured so that it receives said container of surfactant in an interference or friction fit, said clip element configured to be removably attached to an elongated pole element and disengaged from said pole to deploy the container into the water.

2. The apparatus of claim 1, in which the surfactant is a liquid.

3. The apparatus of claim 1, in which the surfactant is a solid bar shaped similarly to a torpedo.

4. The apparatus of claim 1, including an opening in said container, and ballast positioned on said container to urge said opening into a downward position so that said opening communicates with the body of water.

5. A method of calming the water of a swimming pool, including:

providing the apparatus of claim 1;

attaching the apparatus to an elongated pole;

carrying the assembly to a swimming pool location;

removing the apparatus of claim 1 from the pole;

opening the apparatus of claim 1 so that surfactant can be released from inside the container;

deploying the apparatus of claim 1 into the swimming pool.

6. The apparatus of claim 5, wherein the surfactant flows passively from the container into the water.

7. The apparatus of claim 5, further including a pump element configured to mechanically pump the surfactant into the water.

8. The method of claim 5, further including the step of projecting and/or displaying underwater video animations and/or images in the swimming pool.

9. The apparatus of claim 1, including an opening in said container configured to control the volume of surfactant which flows from the container into the water, said volume of surfactant being sufficient to increase surface tension of the water such that the water is calmed.

10. Apparatus for improving the clarity of the surface of a swimming pool or similar body of water, including:

at least one container of surfactant;

at least one buoyant retainer element, said retainer element sized and configured to receive said container in an engaged configuration and provide buoyancy for the container in a body of water;

wherein said container element is configured to allow flow of said surfactant from the container into the swimming pool or body of water, said flow of surfactant into the water being of an amount which increases the surface tension of the water.

11. Apparatus for improving the clarity of the surface of a swimming pool or similar body of water, including:

a pole;

a container having an opening, said opening permitting a volume of surfactant to flow into and/or out of the container, said volume which flows out of the container being an amount which increases water surface tension;

a clip having a retainer portion sized and configured to receive and temporarily retain said container, said clip having an attachment portion for removably connecting said clip to said pole, and at least one biasing element acting on said container and/or said clip to urge said opening into a downward position when said container is floating in the body of water, so that said opening communicates with the body of water.

* * * * *